United States Patent [19]

Perot et al.

[11] Patent Number: 5,199,259

[45] Date of Patent: Apr. 6, 1993

[54] ASSEMBLY COMPOSED OF A PRESSURIZED FLUID MECHANISM AND A DISC BRAKE COUPLED THERETO

[75] Inventors: Marc L. Perot, Eve; Alain W. Noel, Verberie, both of France

[73] Assignee: Poclain Hydraulics, Verberie, France

[21] Appl. No.: 619,137

[22] Filed: Nov. 28, 1990

[30] Foreign Application Priority Data

Nov. 29, 1989 [FR] France .................................. 89 15733

[51] Int. Cl.$^5$ ........................................... F16D 31/02
[52] U.S. Cl. ........................................... 60/435; 60/442
[58] Field of Search ............... 60/435, 439, 442, 493, 60/436

[56] References Cited

U.S. PATENT DOCUMENTS

| | | | |
|---|---|---|---|
| 2,789,542 | 4/1957 | Vander Kaay | 60/442 |
| 3,726,801 | 4/1973 | Sterner et al. | 60/435 |
| 3,805,526 | 4/1974 | Charron | 60/493 |
| 4,204,817 | 5/1980 | Kervagoret | 60/493 |
| 4,481,769 | 11/1984 | Nagahara | 60/442 X |
| 4,557,109 | 12/1985 | Nagahara et al. | 60/436 |
| 4,845,949 | 7/1989 | Shivvers et al. | 60/442 X |
| 4,930,312 | 6/1990 | Metcalf | 60/435 |

FOREIGN PATENT DOCUMENTS

| | | |
|---|---|---|
| 0284388 | 9/1988 | European Pat. Off. . |
| 1399596 | 7/1975 | United Kingdom . |
| 2172677A | 9/1986 | United Kingdom . |

*Primary Examiner*—Edward K. Look
*Assistant Examiner*—Hoang Nguyen
*Attorney, Agent, or Firm*—Sheridan Ross & McIntosh

[57] ABSTRACT

The present invention relates to an assembly of a pressurized fluid mechanism and a brake coupled thereto. The assembly comprises an internal fluid distributor value having a communication face defining, within the housing of the assembly, two enclosures separated by the communication face and a brake comprising a brake-release chamber. The brake-release chamber is in permanent communication with at least one of the two enclosures resulting in a high yield motor of moderate cost.

3 Claims, 2 Drawing Sheets

ASSEMBLY COMPOSED OF A PRESSURIZED FLUID MECHANISM AND A DISC BRAKE COUPLED THERETO

FIELD OF THE INVENTION

The present invention relates to an assembly composed of a pressurized fluid mechanism and of a disc brake which is coupled thereto.

BACKGROUND OF THE INVENTION

GB-A-2 172 677 already discloses an assembly of a pressurized fluid mechanism, motor or pump, and of a disc brake which is coupled thereto, comprising a principal housing; a reaction cam; a cylinder-block mounted for relative rotation with respect to said cam about a geometrical axis and provided with a supply face; a plurality of cylinders arranged in the cylinder-block, substantially radially with respect to said geometrical axis; a plurality of pistons, mounted to slide in said cylinders and capable of being in abutment on said cam, preferably via roller bearings; an internal fluid distributor valve, substantially stationary, vis-á-vis rotation about said geometrical axis, with respect to said cam and provided with a communication face capable of being disposed in abutment on said supply face of the cylinder-block, the substantially tight mutual abutment of said supply and communication faces defining within the principal housing two enclosures separated by said supply and communication faces; a first disc brake element, such as a shaft, fast with respect to rotation about said geometrical axis, with a first of the two parts—cylinder block and cam—and bearing a first set of disc brakes; a second disc brake element, such as a brake housing, fast with respect to rotation about said geometrical axis, with the second of the said two parts—cylinder-block and cam—, and bearing a second set of brake discs; a thrust member, capable of being in abutment on a brake disc disposed at the end of a stack constituted by the assembly of the brake discs of said first and second sets of brake discs; a motive braking member, coupled to said thrust member and capable of causing a braking thrust displacement on said stack of brake discs; and a brake-release jack, coupled between said thrust member and said second disc brake element and comprising a brake-release chamber capable of containing a brake-release fluid under pressure, whose effect is the elimination of the braking thrust on said stack.

In the known mechanisms, the disc brake is entirely distinct from the pressurized fluid mechanism and is generally coupled thereto by the fixation of the brake housing on the principal housing of the mechanism. The shaft is contained in the two, principal and brake, housings, but an O-ring is disposed between one of the two housings and the shaft, completing total separation of the brake and of the mechanism. In addition, this O-ring is subject to dynamic forces between two parts mounted for relative rotation and must consequently present particular characteristics which are relatively expensive.

One of the objects of the invention is the elimination of this O-ring and its arrangements for assembly, and is materialized by the arrangement whereby the brake-release chamber is in permanent communication with a first of said two enclosures, therefore isolated from the second enclosure by mutual abutment of the supply face of the cylinder-block and of the communication face of the distributor valve.

The following advantageous arrangements are, in addition, preferably adopted:
said enclosures are separated in tight manner;
said second enclosure contains the bearing rollers of the pistons on the cam and is connected to a reservoir of non-pressurized fluid.

According to the invention, the fluid contained in the brake-release chamber also fills at least part of the motor housing until it bathes the edge of the substantially tight abutment of the supply face of the cylinder-block and communication face of the internal distributor valve.

There is therefore now only one fluid and the elimination of the O-ring disposed previously between the central shaft and one of the housings results in a simplified mechanism and a reduced cost price thereof.

The fluid which, according to the invention, is now capable of bathing at least one of the edges of the tight abutment between the cylinder-block and the internal distributor valve, brings the following additional advantages:

this fluid is adapted to produce a counter-pressure in the zone of said edge, and therefore to reduce the leakages of supply fluid of the cylinders which occur between said supply and communication faces, which is advantageous per se, and precious in closed circuits, as the characteristics of the booster pump of such a closed circuit are linked with the flowrate of said leakages: a reduction in the flowrate of the leakages enables a smaller booster pump, therefore less expensive, to be chosen;

this fluid is in addition adapted to irrigate the mechanism, i.e. remove excess calories therefrom or, on the contrary, heat it, depending on the existing operational conditions.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
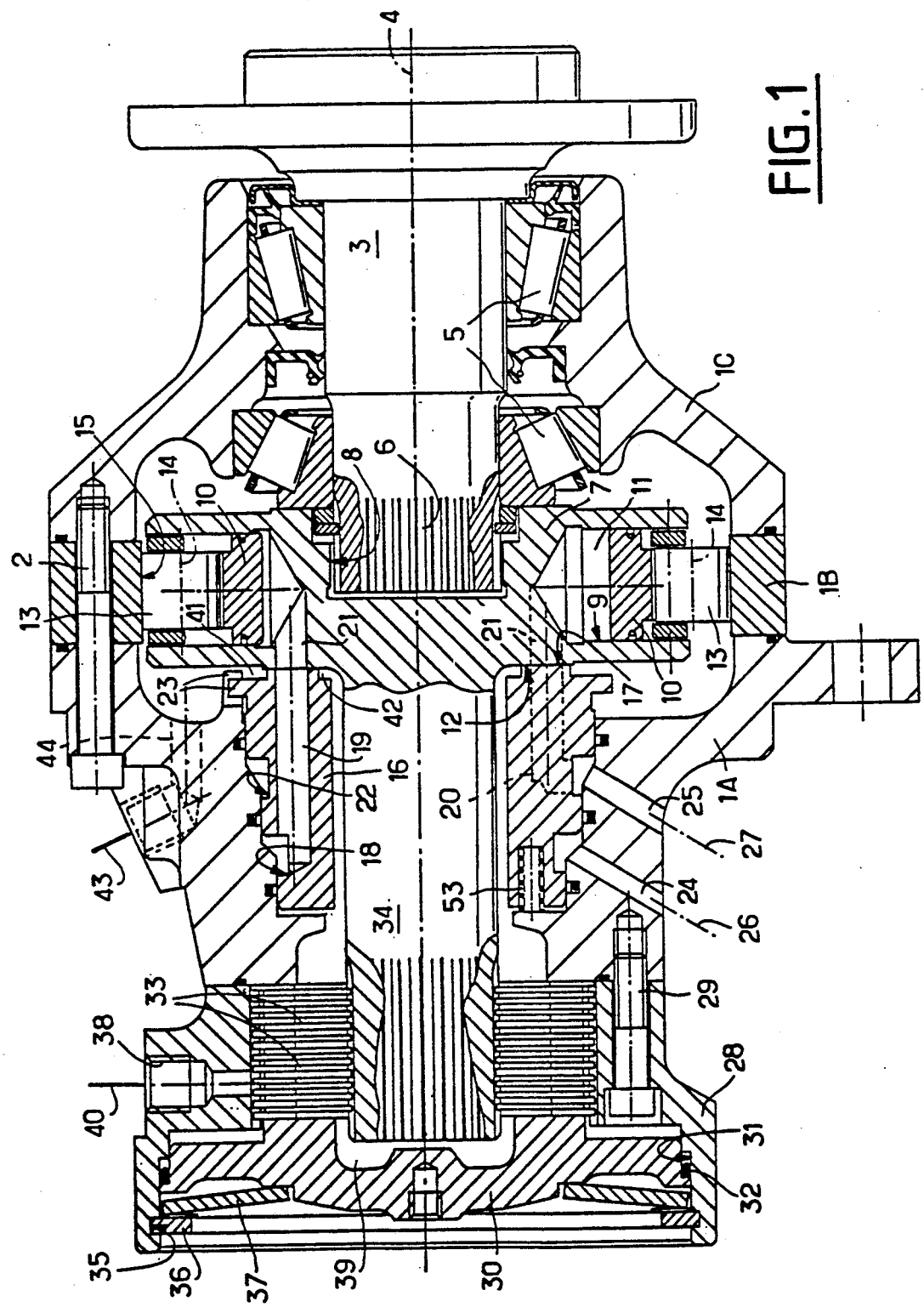
FIG. 1 is an axial section through the assembly of a hydraulic motor and brake, according to the invention.

Referring now to the drawings, the assembly of FIG. 1 comprises a hydraulic motor coupled to a disc brake and is more particularly constituted by:

a principal housing composed of three parts 1A, 1B, 1C, assembled by screws 2;

a drive shaft 3 which is mounted to rotate with respect to the principal housing, about a geometrical axis 4, by means of roller bearings 5 interposed between part 1C of the principal housing and the drive shaft 3, and of which the inner end is provided with splines 6;

a cylinder-block 7, likewise provided with splines 8 which cooperate with the splines 6 of the drive shaft, is contained in the principal housing 1A-1B-1C;

cylinders 9 are arranged in the cylinder-block 7, are disposed radially with respect to the axis of rotation 4, and are angularly spaced apart in regular manner;

pistons 10 are contained in the cylinders, one per cylinder, and define therein as many work chambers 11, which communicate with a plane face 12, perpendicular to the axis of rotation 4, as the cylinder-block 7 comprises, via cylinder conduits 21;

rollers 13 are mounted to rotate about axes 14 parallel to the axis of rotation 4, one on each piston 10;

an undulated cam 15 is constituted by the inner periphery of the intermediate part 1B of the principal housing and is capable of constituting a rolling track for the rollers 13;

an internal fluid distributor valve 16, which is mounted inside the principal housing, comprises a plane face 17, perpendicular to the axis of rotation 4 and in abutment on the plane face 12 of the cylinder-block, and also comprises two circular grooves 18, 22 communicating with the plane face 17 by alternate conduits 19, 20 respectively, capable of communicating with the cylinder conduits 21;

a notch-catch device 23 renders said internal distributor valve 16 and cam 15 fast with respect to rotation about axis 4 (via parts 1A and 1B of the principal housing);

spring studs 53, interposed between part 1A of the principal housing and the internal distributor valve 16, tend to place the plane face 17 of the internal distributor valve in abutment on the plane face 12 of the cylinder-block;

two inner conduits 24, 25, arranged in part 1A of the principal housing, join the grooves 18, 22 to outer conduits 26, 27, respectively for supplying fluid under pressure and for exhaust of pressure-less fluid, of a conventional, known control circuit (not shown), comprising in particular an outer fluid distributor valve;

a brake housing 28 is fixed, by screws 29, on part 1A of the principal housing, of which it constitutes a sort of extension;

the brake housing 28 is obturated by a cover 30, which is mounted to slide in a bore 31 in said brake housing, with the interposition of an O-ring 32 and forms piston;

two pluralities of brake discs 33 are fast, with respect to rotation, the first, with the brake housing 28 on the one hand, the others, with a shaft 34 on the other hand, said shaft 34 being fast, with respect to rotation about axis 4, with the cylinder-block 3 (being in fact monobloc with the cylinder-block) and traversing part 1A of the principal housing until its end is contained inside the enclosure defined by the brake housing 28 and its cover 30, and the discs 33 of the two pluralities being alternate and constituting a stack capable of being pushed by the cover 30;

a groove 35 is formed in the brake housing 28, opens out in the bore 31 and receives a segment 36 forming stop for limiting the displacement of an elastic washer 37, which is interposed between the cover 30 and this segment 36 and whose effect is to tend to bring said cover 30 in thrust abutment on the stack of discs 33;

a connection 38 joining the chamber 39 defined by the brake housing 28 and the cover 30 to an outer conduit 40;

two enclosures 41, 42 which are contained inside the principal housing 1A-1B-1C, and which are separated from each other, with seal, to within the leakages of fluid, by the mutual abutment zone of the plane face 12 of the cylinder-block 7 and face 17 of the internal distributor valve 18, enclosure 41 being an enclosure in which the rollers 13 and the ends of the pistons 10 which support them move and being connected to an outer conduit 43 by a conduit 44 arranged in the wall of the part 1A of the housing, and the enclosure 42 communicating freely with the chamber 39, no O-ring insulating said enclosure from said chamber.

Figure 2:
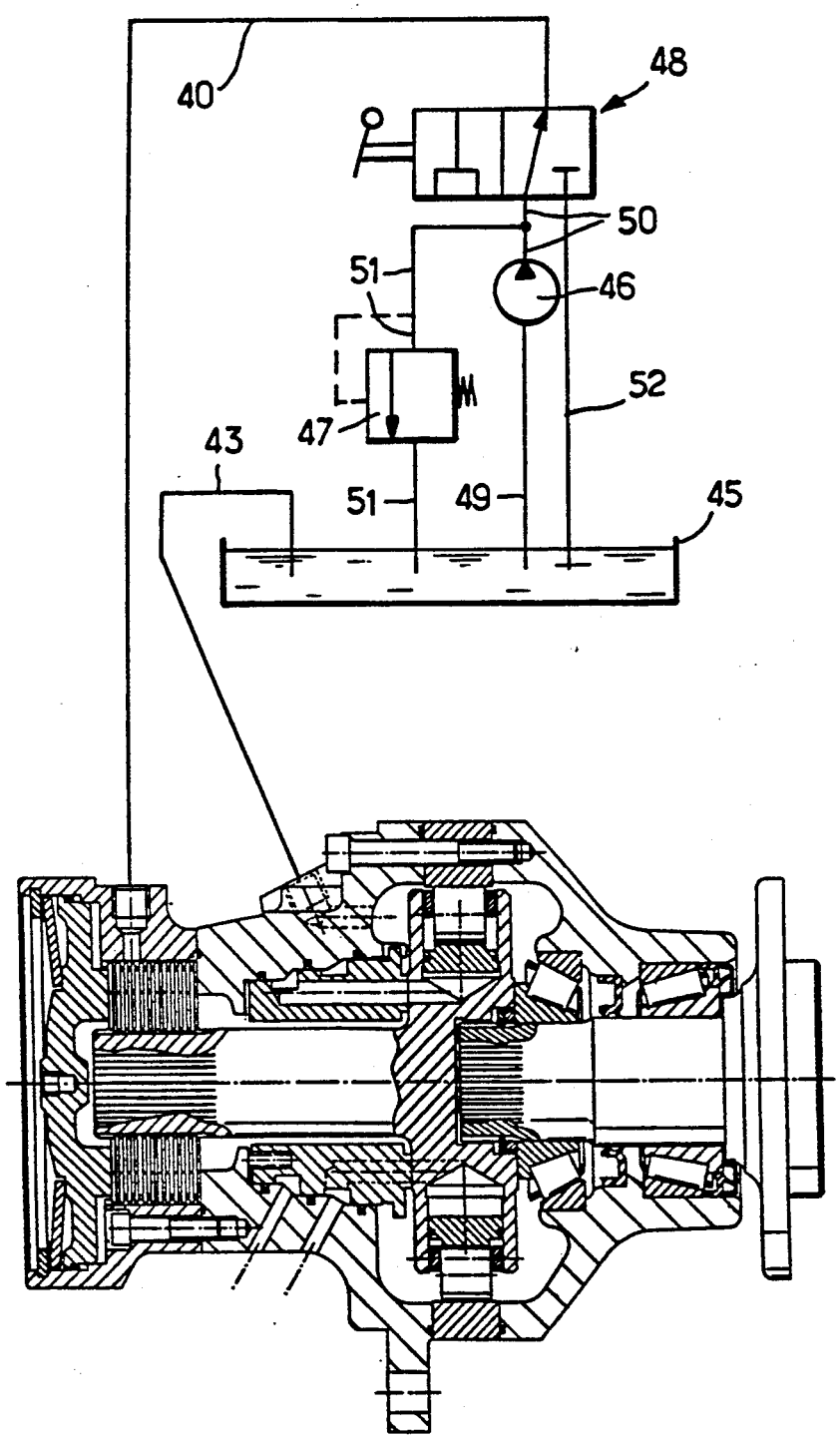
FIG. 2 is a diagram of a control circuit for release of the brake of the assembly of FIG. 1.

The control circuit of FIG. 2 comprises:

the motor and brake assembly which has just been described;

a fluid reservoir 45;

a pump 46;

a discharge valve 47 for protection against excess pressures;

a two-way fluid distributor valve 48; and the following conduits:

the suction conduit 49 of pump 46, which connects the latter to reservoir 45;

the delivery conduit 50 of pump 46, which connects the latter to the two-way distributor valve 48;

a conduit 51, which joins delivery conduit 50 to reservoir 45 and in which is disposed discharge valve 47;

a conduit 52, which joins the two-way distributor valve 48 to reservoir 45;

conduit 40, which is connected to the two-way distributor valve 48; and conduit 43 which is connected to reservoir 45.

The two positions of the distributor valve 48 correspond as follows:

the first position, to the communication of conduits 40, 50 and 52; and the second position, shown in FIG. 2, to the communication of conduits 50 and 40, and to the obturation of conduit 52.

This control circuit functions in conventional manner, as briefly recalled hereinafter: to the first position of the distributor valve 48 there corresponds the communication of chamber 39 with the reservoir 45 and the single action of the elastic washer 37, which pushes piston 30 which, in turn, exerts a braking thrust on the stack of brake discs 33: there is braking of the shaft 34 (and of the cylinder-block 7) with respect to the assembly of the brake housing 28 and principal housing 1A-1B-1C. In its second position, the distributor valve 48 directs the pressurized fluid, delivered by pump 46, in chamber 39, this fluid having an antagonistic effect to that of the elastic washer 37, pushing the piston 30, so as to cancel any braking thrust on the stack of discs 33, and therefore cancelling all braking of the cylinder-block 7 with respect to the principal housing 1A-1B-1C. It should be noted that chamber 39, which is the brake chamber containing the brake discs, also constitutes a brake-release chamber capable of containing a pressurized fluid, particularly when the hydraulic motor is functioning.

It should be noted that this chamber 39, forming brake-release chamber, is in permanent communication with the enclosure 42, without any insulation, particularly tight, separating this chamber and this enclosure.

A first result of the invention is therefore already the elimination of the means which, heretofore, ensured insulation of chamber 39 and enclosure 42, and in particular the elimination of an O-ring between two elements mounted for relative rotation.

It should be noted that, in addition to the simplified manufacture, assembly and maintenance, a second important advantage is obtained: when the motor is in its operational configuration, and when one of grooves 18, 22, therefore conduits 19 and 20 contain a pressurized fluid, the leakages of pressurized fluid which, in the prior known motors (or pumps) escaped into enclosure 42, infiltrating between the plane face 12 of the cylinder-block 7 and face 17 of the internal distributor valve 16, are eliminated in the motor which has been described. In fact, in this operational configuration, enclosure 42 is already filled with the pressurized fluid for controlling brake-release, fluid delivered by pump 46, which suffices to eliminate, or at least considerably reduce, said leakages.

Furthermore, it should be observed that the brake-release pressure exists as soon as the motor functions and is therefore available, since the brake must, in this configuration, necessarily be placed in its non-braking configuration.

This result is particularly interesting when the motor is part of a closed circuit for supplying a receiver, as, in such circuits, said fluid leakages had to be compensated by the complementary flowrate of a booster pump: by eliminating or reducing these leakages, said booster pump can be eliminated or one may be chosen whose flowrate is reduced with respect to what was known before the invention.

The invention is not limited to the embodiment described, but, on the contrary, covers all the variants that may be made thereto without departing from the scope or spirit thereof.

What is claimed is:

1. In an assembly composed of a pressurized fluid mechanism, motor or pump, and of a disc brake coupled thereto, comprising:
   a principal housing;
   a reaction cam;
   a cylinder-block mounted for relatively rotation with respect to said cam about a geometrical axis and provided with a supply face;
   a plurality of cylinders arranged in the cylinder-block, substantially radially with respect to said geometrical axis;
   a plurality of pistons, mounted to slide in said cylinders and capable of being in abutment on said cam, preferably via roller bearings;
   an internal fluid distributor valve, substantially stationary, vis-á-vis rotation about said geometrical axis, with respect to said cam and provided with a communication face capable of being disposed in abutment on said supply face of the cylinder-block the substantially tight mutual abutment of said supply and communication faces defining within the principal housing two enclosures separated by said supply and communication faces, with neither of said two enclosures being connected to a supply fluid and said two enclosures being substantially free of said supply fluid;
   a first disc brake element, fast with respect to rotation about said geometrical axis, with a first of the two parts—cylinder-block and cam—and bearing a first set of brake discs;
   a second disc rake element, fast with respect to rotation about said geometrical axis, with the second of said two parts—cylinder-block and cam—, and bearing a second set of brake discs;
   a thrust member capable of being in abutment on a brake disc disposed at the end of a stack constituted by the assembly of the brake discs of said first and second sets of brake discs;
   a motive braking member, coupled to said thrust member and capable of provoking a braking thrust displacement on said stack of brake discs; and
   a brake-release jack coupled between said thrust member and said second disc brake element and comprising a brake-release chamber capable of containing a brake-release fluid under pressure, whose effect is the elimination of the braking thrust on said stack;
   the brake-release chamber is in permanent communication with a first of said two enclosures, therefore insulated from the second enclosure by the mutual abutment of the supply face of the cylinder-block and the communication face of the distributor valve, said permanent communication being entirely within the motor or pump and said permanent communication being independent of control means between the break-release chamber and the first of said two enclosures.

2. The assembly of claim 1, wherein said enclosures are separated in tight manner.

3. The assembly of claim 2, wherein said second enclosure contains bearing rollers of the pistons on the cam and is connected to a reservoir of fluid.

* * * * *